Dec. 11, 1962     H. J. LOVEGROVE     3,068,408
ELECTRIC CONTROL, DETECTION OR MEASURING SYSTEM
Filed Feb. 10, 1958
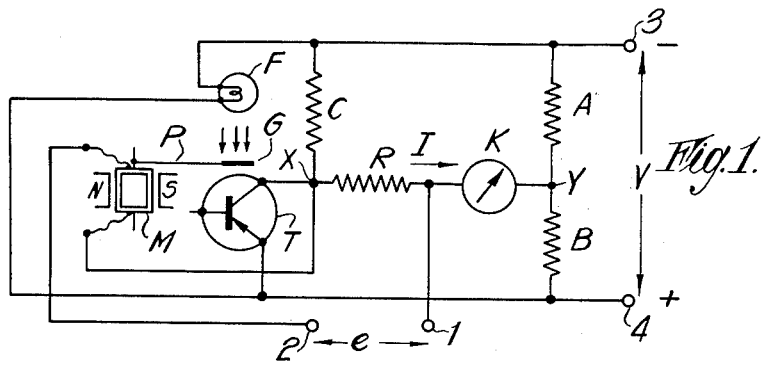
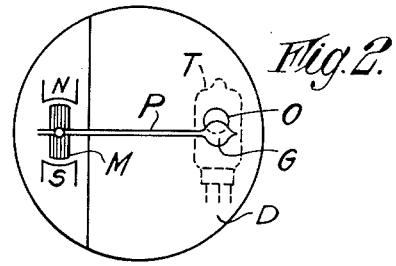
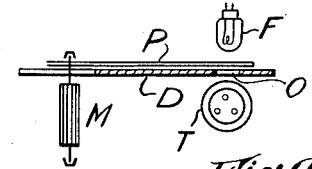
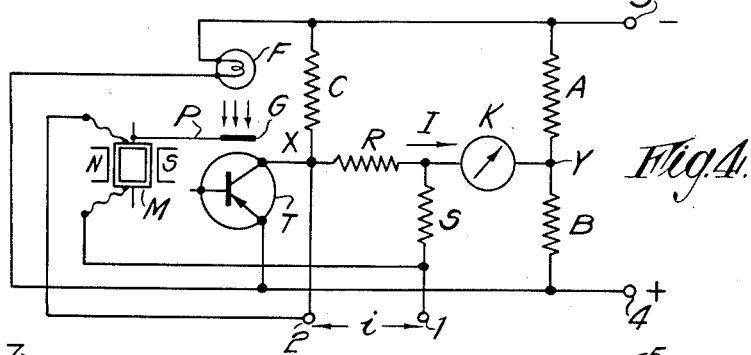
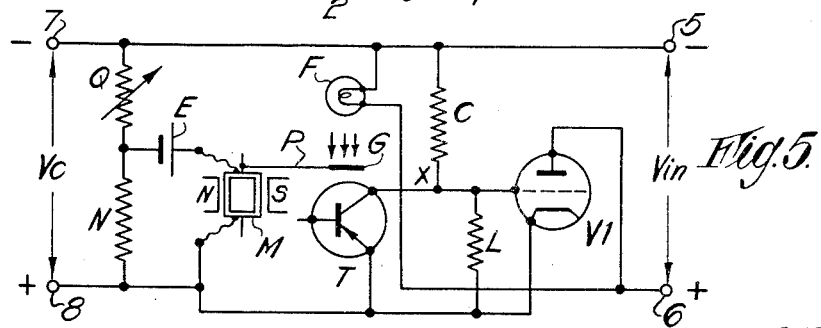
INVENTOR
HENRY JOSEPH LOVEGROVE
BY Rudolph␣J␣Jurick
ATTORNEY

United States Patent Office 3,068,408
Patented Dec. 11, 1962

3,068,408
ELECTRIC CONTROL, DETECTION OR MEASURING SYSTEM
Henry Joseph Lovegrove, Hadley Wood, Barnet, England, assignor, by mesne assignments, to Daystrom, Incorporated, Murray Hill, N.J., a corporation of Texas
Filed Feb. 10, 1958, Ser. No. 714,153
Claims priority, application Great Britain Feb. 15, 1957
2 Claims. (Cl. 324—99)

The present invention relates to electrical control, detection or measuring systems and more particularly to such systems which incorporate a sensitive galvanometer instrument such as a moving coil instrument for determining a balance condition of the circuit and in which the moving system of the instrument either carries or is mechanically coupled to a control device which influences a variable element in the circuit in such a manner as always to re-establish such condition of balance.

In British patent specification No. 700,643 there is described one system of the kind above referred to wherein a sensitive moving coil instrument is connected as a null indicator in a potentiometer circuit and wherein a reactance control device deriving motion from the moving coil system of such instrument exercises an absorption or de-tuning effect on the resonant circuit of a valve oscillator and so is cause to control the value of current flowing in the anode circuit of the oscillator valve. This variation of current is then employed to establish a D.C. voltage to compensate any variation of potential difference tending to unbalance the potentiometer circuit.

Such a system may be employed for the accurate measurement of current or voltage by providing an indicating instrument to measure a current whose amplitude value is dependent on the variation of the oscillator output and which is proportional to the input current or voltage to be measured. When the originating factor causing the unbalance in the potentiometer circuit is a quantity other than current or voltage but which bears a known relation to current or voltage, the indicating instrument may be calibrated directly in terms of said quantity.

An object of the present invention is to provide an improved and simplified system of this or a generally related type and in consequence to extend the field of application of such a system.

A further object of the invention is the provision of a highly sensitive bridge circuit in which a photo-transistor and a moving coil instrument are arranged to exert a mutual control in the sense of counteracting any unbalancing exerted in the bridge circuit and to employ this control effect for measurement or D.C. amplification purposes.

In an electrical system according to the broadest aspect of the present invention there is provided a photo-transistor forming at least a part of a current flow circuit arranged for connection across a current supply source, a source of illumination for said photo-transistor, a movable light control member in a light transmission path between said illumination source and said photo-transistor, a galvanometer, having a moving system which is mechanically coupled to said light control members to vary the illumination of said photo-transistor in accordance with the value of operating current supplied to said galvanometer and means for applying to said galvanometer an operating current which is the resultant of an input control current or voltage and an opposing feedback current or voltage derived from and variable in accordance with the current flowing in said circuit including said photo-transistor whereby a condition of balance is obtained by variation of said feedback current or voltage through adjustment of the illumination of said photo-transistor by said light control member.

In a particular form of the invention an automatic control, detection or measuring system comprises a sensitive D.C. moving-coil type instrument, a potentiometer network arranged for connection across a D.C. current supply source, said network including in one arm thereof a photo-transistor, a source of illumination for said transistor, a movable light control member in the light transmission path between said illumination source and said photo-transistor, said light control member being mechanically coupled to the moving coil system of said instrument to vary the illumination and hence the response of said photo-transistor in accordance with the value of operating current applied to said instrument and means for applying to said instrument an operating current which is the resultant of an input control current or voltage and an opposing feedback current or voltage which is derived from and is variable in accordance with the current flowing in said potentiometer network, the arrangement being such that a condition of balance is automatically obtained by variation of said feedback current or voltage to a value equalling that of said input control current or voltage through adjustment of the illumination of said photo-transistor by means of said light control member.

Such a system may be arranged to have a very high input impedance and is therefore particularly suitable for measurement and D.C. amplification purposes.

In the case where measurement or amplification of small E.M.F.'s are required, input terminals are arranged in the branch containing the moving coil instrument and for each variation of the voltage at the input terminals the bridge automatically rebalances with a proportional flow of current across an output resistor in the said branch without drawing any current from the input circuit.

The required relationship between the movement of the moving coil system of the instrument and the response of the photo-transistor may be realised by housing such transistor with its sensitive surface exposed through an aperture in the scale plate of the instrument which is normally illuminated by a small lamp, a vane carried by the pointer arm of the moving coil system being arranged to interrupt the light beam falling on the photo-transistor and whereby to vary the illumination thereof.

In order that the nature of the invention may be more readily understood several embodiments thereof will now be described in greater detail and by way of illustrative example only with reference to the accompanying drawings in which:

FIG. 1 is a schematic circuit diagram of one embodiment suitable for illustrating the basic principle of the invention.

FIGS. 2 and 3 are largely diagrammatic views showing constructional features of one possible arrangement for effecting automatic control of the illumination of the photo-transistor by the moving coil instrument.

FIG. 4 is a schematic view of an arrangement similar to that of FIG. 1 but adapted for operation by a low value variable current.

FIG. 5 is a schematic view of a further arrangement for supplying a constant potential, e.g. for the purpose of calibrating electrical measuring instruments.

Referring first to FIGURE 1 of the drawings, this shows an arrangement more particularly adapted for effecting D.C. voltage amplification and measurement. The arrangement comprises a photo-transistor T connected in series with a fixed value resistor C to form a potentiometer network which is connected between terminals 3 and 4. These terminals, in the operation of the arrangement, are connected to a D.C. supply source having a substantially constant voltage V. Such potentiometer network forms one of the two opposing pairs of arms of a bridge network, the other pair of arms of such bridge network being constituted by the series connected resistors A and B, also of fixed value and also connected between terminals 3 and 4. The junction point X between resistor C and photo-transistor T is connected to the similar junction point Y between resistors A and B by a circuit which includes a fixed value resistor R in series with a current measuring instrument K.

A galvanometer instrument of high sensitivity, for example and as shown, a moving type coil instrument M, has one of its input terminals connected to the junction point X and the other of its input terminals connected to a terminal 2 which, in conjunction with terminal 1, form input terminals for the connection thereto of the input control voltage which is to be amplified and measured. The terminal 1 is connected to the junction point between resistor R and the measuring instrument K.

A source of illumination F in the form of a miniature incandescent filament lamp, is also connected across the terminals 3 and 4 and is disposed so that light therefrom can pass to the light-sensitive region of the photo-transistor T. In the light transmission path between the source F and the photo-transistor T is disposed a light control member P which is coupled to the moving system, e.g. the moving coil, of the instrument M whereby the degree of illumination of the photo-transistor T is altered by movement of the moving system of the instrument.

One particular and convenient form of the instrument M, photo-transistor T and illumination source F as shown in FIGURES 2 and 3 from which it will be observed that the photo-transistor T is mounted on one side, conveniently the underside, of the instrument scale plate D which latter is provided with a small aperture O therein immediately opposite the light sensitive region of the photo-transistor T. The lamp F is mounted on the opposite side, e.g. the upper or outer side of the scale plate whereby the latter forms an apertured mask between the light source and the photo-transistor. The moving system M of the instrument has the usual indicating pointer cooperating with the upper or outer surface of the scale plate D and to this pointer is attached a vane G of suitable shape and size and so positioned that it can co-operate with the aperture O during movement of the member P to vary between the light passing from the lamp F to the photo-transistor T. The instrument M is preferably one having no control springs attached to its moving system, the necessary connection to the moving coil winding in the example shown, being made by torqueless ligaments so that the pointer is free to take any position relative to the aperture O in the scale plate D.

The manner of operation of such arrangement is as follows:

The case first to be considered is that of when the input terminals 1 and 2 are short-circuited. The position of the light control member or pointer P controls the amount of light reaching the photo-transistor T from the lamp F and thereby controls the value of collector current flowing through the resistor C. This, in turn, determines the potential of the point X.

If, under such short-circuit conditions, the potential at point X is higher than the potential at point Y, as may be caused, for example, by an excessive amount of light reaching the photo-transistor, current flows through an impedance such as resistor R and through the instrument M since the latter is effectively connected in parallel with resistor R by the short-circuiting of the input terminals 1 and 2. The sense of the current flow in the instrument M is such that the pointer P moves in a direction which reduces the amount of light from the lamp F reaching the photo-transistor T and when this occurs the transistor collector current is reduced until the points X and Y are at the same potential. Under this condition, no current is flowing through the resistor R and therefore no current is flowing through the instrument M.

If, on the other hand, the potential of point X is initially lower than that of point Y as may be caused by insufficient light reaching the photo-transistor T, the current flowing through the resistor R and hence through the instrument M is in the opposite direction and is such as to cause the pointer P to move in the direction which increases the amount of light reaching the photo-transistor T. This causes an increase of the collector current of the transistor thereby raising the potential of point X until points X and Y are at the same potential. When this occurs there is no current flow through either of the resistor R or the instrument M.

The bridge netwoork of resistors A, B, C and photo-transistor T is now balanced with no current in the output current measuring instrument K.

The case which will now be considered is that of when the input terminals 1 and 2 are not short-circuited but are connected instead to low resistance source of small E.M.F. such as a thermocouple.

When an input voltage $e$ of, say, a few millivolts, is applied to the input terminals 1 and 2, a small current $i$ flows around the loop circuit consisting of the instrument M and the series resistor R. The pointer P therefore moves in that direction which allows more light to reach the photo-transistor T from the lamp F. This causes an increase of the collector current in the photo-transistor T and therefore increases the potential across the resistor C. Since point X is now raised to a higher potential than point Y, current flows from point X to point Y through the resistor R. In consequence of this current flow through resistor R a voltage is developed across this resistor and this voltage has a polarity such that opposes the applied input voltage $e$ at the terminals 1, 2. The resultant voltage available to cause current flow around the loop circuit is accordingly reduced until eventually the voltage across the resistor R is equal but opposite to the input voltage $e$ applied to terminals 1 and 2. Under this condition no current is being drawn from the voltage source applied to input terminals 1 and 2 but there is a current of a value related to the input voltage $e$ passing through the instrument K.

Provided the resistor R is of constant value, as can readily be arranged, the output current I which flows through the indicator K is directly proportional to the input voltage $e$ applied to the input terminals 1, 2. Therefore at the balance condition $$I=\frac{e}{R}$$

Where I is the output current in milliamps flowing through instrument K, $e$ is the input voltage in millivolts applied to terminals 1, 2 and R is the value of the range determining resistor R in ohms.

A multi-range measuring system can obviously be provided by arranging for alteration, as by switch means, of the value of the resistor R.

It will be evident that the system can be arranged to have an extremely rapid response to any unbalancing influence and that negligible current is drawn from the voltage source applied to the input terminals 1, 2. This input current is at a maximum value only during the short period of time required for the measuring intrument M to move the light controlling pointer P to the new position necessary to effect balance under the new conditions.

The automatic re-balancing action provides a rigid form of control and instead of or in addition to the current measuring instrument K, there may be provided any suitable form of controlled means, such as a servo system, which is effective either directly or indirectly upon the source of the input voltage $e$ whereby the intitial disturbing force which caused a change is appropriately corrected.

In the construction of such a device, use is preferably made of a photo-transistor which is sensitive to infra-red radiation whereby the lamp F may be run at only dull red heat. This allows the lamp to draw only a small operating current and also serves to extend its useful life.

FIGURE 4 shows a slight modification of the arrangement shown in FIGURE 1 and is particularly adapted for effecting amplification and measurement of a D.C. current. In this arrangement the photo-transistor T is arranged as part of a bridge network in conjunction with resistors A, B and C as before while the interconnection of points X and Y is again through resistor R and current measuring instrument K. In this embodiment, however, the current input terminals 1 and 2 are connected directly to the input terminals of the instrument M, e.g. to the opposite ends of the moving coil winding. The input terminal 1 is also connected by way of series resistance S to the junction between resistor R and measuring instrument K while input terminal 2 is connected directly to the point X between resistor C and photo-transistor T.

The manner of operation of this modified arrangement of FIGURE 4 is broadly similar to that of the arrangement of FIGURE 1 already described and is as follows:

Assuming first the condition when terminals 1, 2 have no current source connected thereto, i.e., they are open-circuited. If the potential at point X is higher than the potential at point Y, for instance, on account of an excessive amount of light reaching the photo-transistor T, then current flows between the points X and Y by way of the parallel paths of resistor R and of the instrument M and resistor S to the measuring instrument K and point Y. The sense of the current flow in instrument M is such as to move its pointer P in the direction to decrease the amount of light reaching the photo-transistor T thereby reducing the transistor collector current until the potential drop across the resistor C is equal to the potential drop across the resistor A. Under this, initial balance, condition no current is flowing through resistor R or through the parallel circuit of intrument M and resistor S. No current indication is given by the measuring intrument K.

Alternatively if, under the same open-circuit conditions of terminals 1, 2, the potential of point X is initially lower than that of point Y as may be caused by insufficient light reaching the transistor T, then current flows between points Y and X by way of the measuring instrument K and then through the parallel paths of resistor R and of resistor S in series with the instrument M. This, opposite, direction of current flow in instrument M causes pointer movement in a direction to increase the light incident upon the transistor T and hence to increase the collector current to the level where the potential at point X equals that at point Y.

The bridge network of resistors A, B, C and photo-transistor T is now balanced with no current through either the instrument M or the measuring instrument K. Before considering the conditions which arise when a current source is connected to input terminals 1 and 2, particular note should be taken of the current flow direction light/change relationships assumed above in the instrument M. (In practice, either current flow direction can be made to produce either sense of light change by appropriate choice of the approach direction of the pointer P to the aperture O or by choice of the sense of connection to the coil of the instrument M.) These assumed relationships were as follows: If point X was positive relative to point Y, the resultant direction of current flow through instrument M caused decrease of transistor collector current and, conversely, if point X was negative relative to point Y, the resultant direction of current flow through instrument M caused increase of transistor collector current.

It will now be assumed that a source of a current value $i$ is connected to the input terminals 1, 2 and that the polarity of such source is that terminal 1 is negative and terminal 2 is positive. If the circuit was initially in balanced condition, current from the input source will flow mainly through the instrument M in the direction which will decrease the transistor collector current and will also flow to a lesser extent through the parallel branch circuit of resistor R and resistor S. The resultant movement of pointer P to reduce the collector current of the transistor T causes the point X to move negatively relative to point Y whereby current now flows from point Y through measuring instrument K and resistor R to point X. This sets up a potential drop across the resistor R such that the junction between resistor R and resistor S is positive relative to point X. This potential drop may be regarded as the equivalent of a source of potential in series-aiding relationship to that providing the input current to terminals 1, 2 and which would provide a current through resistor S and instrument M opposite to that provided by the input at terminals 1, 2. When this current reaches a value equal to the input current $i$, its flow will be entirely in the loop circuit including the input current source connected to terminals 1, 2, the potential difference between terminals 1 and 2 will become zero and no current will flow through the instrument M. Thus the balance condition is that when $$i = \frac{R}{S+R} I$$

where $i$ is the value of the input current in milliamps, $S$ is the value of the additional resistor S in ohms and R and I are as previously stated.

In the converse case where the input source connected to terminals 1 and 2 has a polarity such that terminal 1 is positive and terminal 2 is negative, the initial current flow through the instrument M is in the direction which causes increase of light to the transistor T with resultant increase of the transistor collector current so that point X will move positively relative to point Y. The direction of the cancelling current portion derived from that flowing between points X and Y and passing around the loop circuit including resistor S is now in the reverse direction to the previously described case and the same balance condition is eventually arrived at when no current flows through the instrument M.

FIGURE 5 shows a further embodiment of the invention in the form of an arrangement for supplying current at a constant potential such as for the purpose of calibrating electrical measuring instruments.

In this embodiment the transistor T is connected as in the previous embodiment as part of a potentiometer network also including the series resistor C. Terminals 5 and 6 constitute input terminals for connection to a source of operating current, terminal 5 being connected to the free end of the resistor C and also to one of a pair of constant voltage output terminals 7 and 8. The other input terminal 6 is connected to the anode of a thermionic valve V1, the cathode of which is connected to the other constant voltage output terminal 8 and also to the emitter electrode terminal of the photo-transistor T. The junction point X between the resistor C and photo-transistor T is connected to the control grid of the valve V1 and also to one end of a leak resistor L the opposite end of which is connected to the valve cathode. The lamp F is energised by connection across the terminals 5 and 6.

Connected across the constant voltage output terminals 7 and 8 is a further potentiometer network of variable resistor Q and fixed resistor N. The junction point between these two resistors is connected to one terminal of a standard cell E, the opposite terminal of which is connected to one input terminal of the instrument M, the opposite terminal of which is connected to the constant voltage output terminal 8. The instrument M includes a pointer arm P having an attached vane operating as a light control member exactly as in the previous embodiments.

In the operation of such an arrangement the value of the resistor Q may be varied during use to provide the required output voltage when the potential of the standard cell E is balanced against the potential drop across the resistor N. Under these conditions the bias voltage developed at the point X for application to the control grid of the valve V1 is such that the impedance of that valve is appropriate to supply the required value of current to the terminals 7, 8 with the required voltage difference therebetween. Any subsequent unwanted fluctuation of the supply voltage to terminals 5, 6 or alteration of the load current taken from the constant output voltage terminals 7, 8 will cause unbalance between the E.M.F. of the standard cell E and the opposing potential developed across the resistor N whereby the light control pointer P will be moved either to increase or decrease the light falling on the photo-transistor T with consequent change of the potential at the point X whereby the valve V1 is caused to alter its impedance in a manner which compensates for the change which has taken place.

Although particularly described with relation to voltage or current amplification or measurement or to the supply of a constant voltage output, it will be evident that the basic principle of the invention is readily adaptable to other purposes such as process control, remote indication, automatic alarm and the like. Similarly, it will be apparent that a device other than a thermionic valve, for instance a transistor, may be used in arrangements of the kind described with relation to FIG. 5.

I claim:

1. An automatic electrical system comprising:
   a sensitive D.C. moving-coil type instrument,
   a potentiometer network arranged for connection across a D.C. supply source, said network including a phototransistor and first resistor in series therewith,
   a source of illumination for said transistor,
   a movable light control member in the light transmission path betwen said illumination source and said photo-transistor, said light control member being mechanically coupled to the moving coil system of said instrument to vary the illumination and hence the response of said photo-transistor in accordance with the value of an input signal applied to said instrument,
   said potentiometer network also including a second and third resistor connected in series, thereby to form a bridge network having input terminals connected across said D.C. supply source, and output terminals at the respective junctions of said phototransistor and resistor and said second and third resistors,
   circuit means including a first impedance means connected across said bridge output terminals,
   means including a pair of input signal terminals adapted to receive an input signal.
   the moving coil of said instrument and said impedance means being serially connected across said input signal terminals, whereby input signal current in said impedance means is automatically balanced out by variation of an opposing current to a value substantially equalling that of said input signal current through adjustment of the illumination of said phototransistor by means of said light control member, whereby said input signal terminals present a relatively high impedance to input signals.

2. An automatic electrical system comprising:
   a sensitive D.C. moving-coil type instrument,
   a potentiometer network arranged for connection across a D.C. supply source, said network including a phototransistor and first resistor in series therewith,
   a source of illumination for said transistor,
   a movable light control member in the light transmission path between said illumination source and said photo-transistor, said light control member being mechanically coupled to the moving coil system of said instrument to vary the illumination and hence the response of said photo-transistor in accordance with the value of an input signal applied to said instrument,
   said potentiometer network also including a second and third resistor connected in series, thereby to form a bridge network having input terminals connected across said D.C. supply source, and output terminals at the respective junctions of said phototransistor and resistor and said second and third resistors,
   circuit means including a first impedance means connected across said bridge output terminals,
   means including a pair of input signal terminals adapted to receive an input signal,
   a second impedance means connected in series with said first impedance means across said input signal terminals,
   the moving coil of said instrument being directly connected across said input signal terminals, whereby input signal current in said impedance means is automatically balanced out by variation of an opposing current to a value substantially equalling that of said input signal current through adjustment of the illumination of said photo-transistor by means of said light control member, whereby said input signal terminals present a relatively high impedance to input signals.

References Cited in the file of this patent

UNITED STATES PATENTS

| 2,059,786 | Gilbert | Nov. 3, 1936 |
| 2,127,845 | Ryder | Aug. 23, 1938 |
| 2,262,790 | Bean et al. | Nov. 18, 1941 |
| 2,267,681 | Fairchild | Dec. 23, 1941 |
| 2,651,019 | Fink | Sept. 1, 1953 |
| 2,652,743 | Morrow | Sept. 22, 1953 |
| 2,673,935 | Waldhauer | Mar. 30, 1954 |
| 2,685,064 | Bergen | July 27, 1954 |
| 2,765,986 | Pompetti | Oct. 9, 1956 |
| 2,808,559 | Engle | Oct. 1, 1957 |
| 2,843,756 | Wise | July 15, 1958 |
| 2,894,145 | Lehovec | July 7, 1959 |

FOREIGN PATENTS

| 497,728 | Great Britain | Mar. 19, 1937 |